(12) United States Patent
Li

(10) Patent No.: US 8,708,541 B2
(45) Date of Patent: Apr. 29, 2014

(54) BACKLIGHT MODULE AND DISPLAY PANEL

(71) Applicant: Quan Li, Guangdong (CN)

(72) Inventor: Quan Li, Guangdong (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 23 days.

(21) Appl. No.: 13/702,284

(22) PCT Filed: Sep. 26, 2012

(86) PCT No.: PCT/CN2012/081978
§ 371 (c)(1),
(2), (4) Date: Dec. 5, 2012

(65) Prior Publication Data
US 2014/0085925 A1    Mar. 27, 2014

(51) Int. Cl.
*F21V 7/04* (2006.01)
(52) U.S. Cl.
USPC .......................................... 362/606; 362/634
(58) Field of Classification Search
USPC ........................................ 362/606, 632–634
See application file for complete search history.

(56) References Cited

U.S. PATENT DOCUMENTS

| | | | |
|---|---|---|---|
| 8,616,756 B2* | 12/2013 | Kiyohara | 362/633 |
| 2006/0056200 A1* | 3/2006 | Yamashita et al. | 362/620 |
| 2012/0281153 A1* | 11/2012 | Kuromizu | 348/790 |

* cited by examiner

*Primary Examiner* — Evan Dzierzynski
(74) *Attorney, Agent, or Firm* — Kirton McConkie; Evan R. Witt

(57) ABSTRACT

The present invention provides a backlight module and display panel. The backlight module includes a light guiding plate, an optical film, and at least two positioning structure. The at least two positioning structure are placed on the opposite side surfaces of the light guiding plate. Each of the positioning structure includes a main positioning member and a sub positioning member fixedly connected to the main positioning member. The main positioning member is fixedly connected to the side surface of the light guiding plate. The sub positioning member extends for a fixing distance along the main positioning member. The opposite at least two sub positioning member fix the optical film on the emitting surface of the light guiding plate.

18 Claims, 4 Drawing Sheets

BACKLIGHT MODULE AND DISPLAY PANEL

BACKGROUND OF THE INVENTION

1. Field of the Invention

The invention relates to a display, and more particularly, to a backlight module and display panel.

2. Description of the Prior Art

As the population of display panels, the demands for improving components of the display panels become more and more.

Please refer to FIG. 1, which is a diagram showing a part of structures of a conventional backlight module. The backlight module 10 comprises a light guiding plate (LGP) 11 and an optical film 12. The optical film 12 is stuck on the light guiding plate 11. The optical film 12 is placed on the emitting surface of the LGP 11. Because the surfaces of the LGP 11 and the optical film 12 are both smooth, the optical film 12 easily comes off from the LGP 11. Especially for a backlight module having a narrow side frame, the optical film 12 is more possible to come off from the LGP 11 because of its limited space.

In order to prevent the optical film 12 from coming off from the LGP 11, one solution is to use a mylar 13 to stick the optical film 12 on the LGP 11. Unfortunately, the above-mentioned solution has following problems.

First, because the optical film 12 and the LGP 11 are both smooth and not easy to be aligned to each other, this makes the mylar not easy to stick on the LGP 11 and the optical film 12.

Second, the mylar 13 is easily stuck on the view region 14 and ruins the performance of the display.

Third, due to the strong stickiness of the mylar 13, the optical film 12 cannot timely expand when the optical film 12 is heated up. This ruins the optical film 12.

Therefore, another solution is needed to solve the above-mentioned problems.

SUMMARY OF THE INVENTION

It is therefore one of the primary objectives of the present invention to provide a backlight module to solve the above-mentioned problems of low display performance and damage of the optical film due to the misalignment of the optical film and LGP when fixing the optical film and the LGP.

According to an exemplary embodiment of the present invention, a backlight module comprises a light guiding plate, having a emitting surface, a bottom surface opposite to the emitting surface, and a plurality of side surfaces; and an optical film, stuck on the emitting surface of the light guiding plate. The backlight module further comprises at least two positioning structures, placed on two side surfaces opposite to each other, wherein each of the two positioning structures comprises a main positioning member and a sub positioning member, the main positioning member and the sub positioning member are integrally manufactured in a piece, and the sub positioning member is formed by extending an end or all of the main positioning member;

wherein the main positioning member is fixed on the side surface of the light guiding plate, a reflection material is spread on an inner side of the main positioning member, the sub positioning member extends for a fixing distance along the main positioning member, and the at least two sub positioning members placed oppositely fix the optical film on the emitting surface of the light guiding plate.

In one aspect of the present invention, the positioning structure further comprises a fixing member formed by bending part or all of the main positioning member at one end, and is stuck on the emitting surface or bottom surface of the light guiding plate.

In another aspect of the present invention, the fixing member is stuck on the emitting surface of the light guiding plate, and the fixing member is formed by bending part of the main positioning member at one end and the sub positioning member is formed by the remains of the main positioning member at the end.

In another aspect of the present invention, the fixing member is stuck on the bottom surface of the light guiding plate.

In another aspect of the present invention, the fixing member further comprises a first fixing member and a second fixing member, the first fixing member is stuck on the bottom surface of the light guiding plate, and the second fixing member is stuck on the emitting surface of the light guiding plate.

In another aspect of the present invention, the optical film comprises an extension part connected to the sub positioning member, the extension part has a trench for allowing the sub positioning member to plug in.

In another aspect of the present invention, a thickness of each of the main positioning member, the sub positioning member, and fixing member is between 0.2 millimeter and 0.4 millimeter.

In another aspect of the present invention, the fixing distance is between 1.0 millimeter and 5.0 millimeter.

Also, another objective of the present invention is to provide a backlight module to solve the above-mentioned problems of low display performance and damage of the optical film due to the alignment difficulty of the optical film and LGP when fixing the optical film and the LGP.

According to the present invention, a backlight module comprises a light guiding plate, having a emitting surface, a bottom surface opposite to the emitting surface, and a plurality of side surfaces; an optical film, stuck on the emitting surface of the light guiding plate; and at least two positioning structures, placed on two side surfaces opposite to each other, each of the two positioning structures comprising a main positioning member and a sub positioning member. The main positioning member is fixed on the side surface of the light guiding plate, the sub positioning member extends for a fixing distance along the main positioning member, and the at least two sub positioning members placed oppositely fix the optical film on the emitting surface of the light guiding plate.

In one aspect of the present invention, the main positioning member and the sub positioning member are integrally manufactured in a piece, and the sub positioning member is formed by extending part or all of the main positioning member at one end.

In another aspect of the present invention, the positioning structure further comprises a fixing member formed by bending part or all of the main positioning member at one end, and is stuck on the emitting surface or the bottom surface of the light guiding plate.

In another aspect of the present invention, the fixing member is stuck on the emitting surface of the light guiding plate, and the fixing member is formed by bending part of the main positioning member at an end, and remains of the main positioning member at the end form the sub positioning member.

In another aspect of the present invention, the fixing member is stuck on the bottom surface of the light guiding plate.

In another aspect of the present invention, the fixing member further comprises a first fixing member and a second fixing member, the first fixing member is stuck on the bottom surface of the light guiding plate, and the second fixing member is stuck on the emitting surface of the light guiding plate.

In another aspect of the present invention, a reflection material is spread on an inner side of the main positioning member.

In another aspect of the present invention, the optical film has an extension part connected to the sub positioning member, the extension part has a trench for allowing the sub positioning member to plug in.

In another aspect of the present invention, a thickness of each of the main positioning member, the sub positioning member, and fixing member is between 0.2 millimeter and 0.4 millimeter, the fixing distance is between 1.0 millimeter and 5.0 millimeter.

Moreover, another objective of the present invention is to provide a display panel to solve the above-mentioned problems of low display performance and damage of the optical film due to the alignment difficulty of the optical film and LGP when fixing the optical film and the LGP.

According to another embodiment of the present invention, a display panel is disclosed. The display panel comprises the above-mentioned backlight module. The backlight module comprises a light guiding plate and an optical film. The light guiding plate comprises a emitting surface, a bottom surface, and a plurality of side surfaces. The optical film is stuck on the emitting surface of the light guiding plate.

The present invention provides a positioning structure. The positioning structure comprises a main positioning member and a sub positioning member fixedly connected to the main positioning member. The sub positioning member extends for a fixing distance along the main positioning member. The main position member is fixed on the side surface of the light guiding plate, and the two opposite sub positioning members can position the optical film on the emitting surface. Moreover, the present invention can align the optical film with the light guiding plate and prevent from influencing the view region without affecting the extension when the optical film is heated up. This raises the display performance of the LCD panel.

These and other objectives of the present invention will no doubt become obvious to those of ordinary skill in the art after reading the following detailed description of the preferred embodiment that is illustrated in the various figures and drawings.

DETAILED DESCRIPTION OF THE PREFERRED EMBODIMENT

Figure 1:
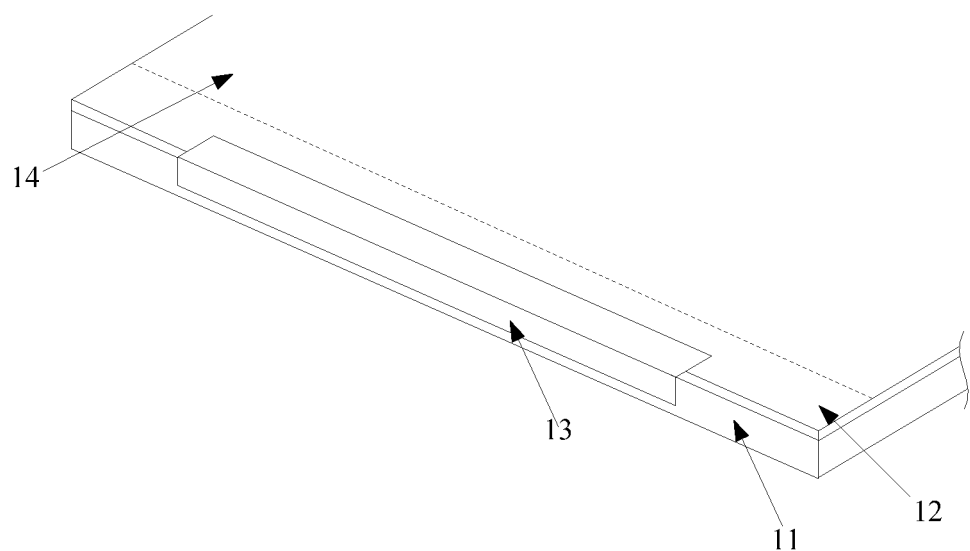
FIG. 1 is a diagram showing a part of structures of a conventional backlight module.
Figure 2:
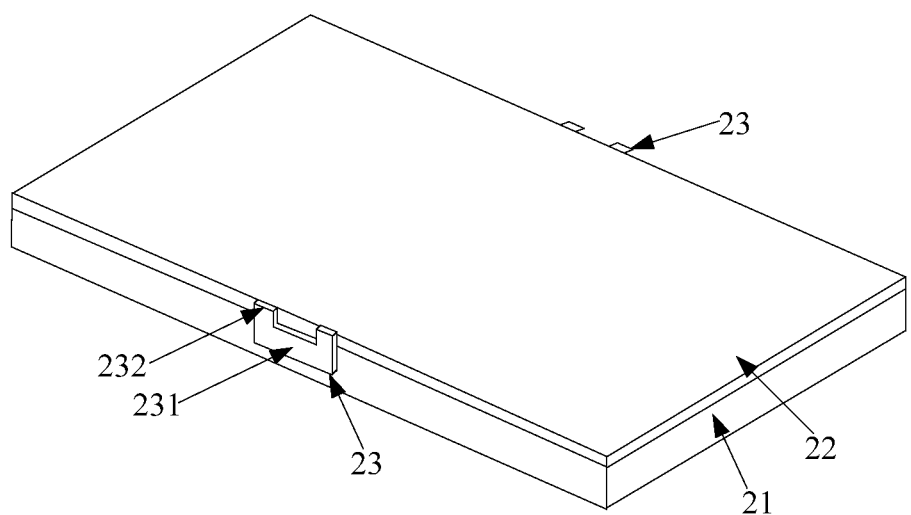
FIG. 2 is a diagram of a backlight module according to an embodiment of the present invention.

Please refer to FIG. 2, which is a diagram of a backlight module according to an embodiment of the present invention.

The backlight module comprises a light guiding plate (LGP) 21, an optical film 22, and at least two positioning structures 23. The LGP 21 and the optical film 22 are stuck together. The LGP 21 comprises an emitting surface, a bottom surface opposite to the emitting surface, and a plurality of side surfaces (not shown).

The optical film 22 is stuck on the emitting surface of the LGP 21. The emitting surface and the bottom surface are placed oppositely. The positioning structures 23 are placed on the side surfaces of the LGP 21. In addition, in this embodiment, at least two positioning structures 23 are placed on the opposite side surfaces of the LGP 21. Preferably, the positioning structure 23 is manufactured with a metal material, such as stainless plate SUS304.

Figure 3:
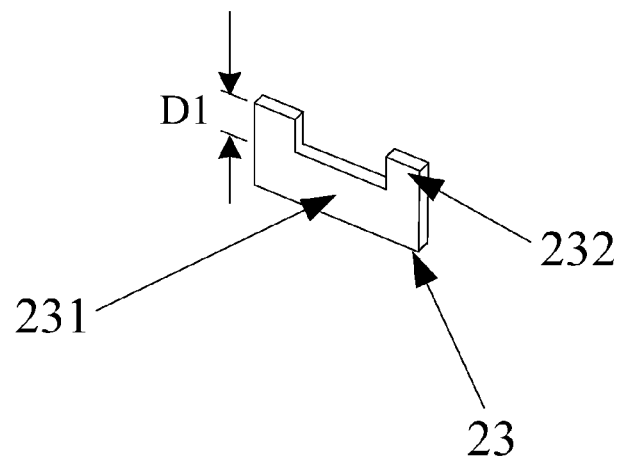
FIG. 3 is a diagram of a positioning structure according to a first embodiment of the present invention.

Please refer to FIG. 3, which is a diagram of a positioning structure according to a first embodiment of the present invention. The positioning structure in FIG. 3 is the positioning structure 23 in FIG. 2.

The positioning structure 23 comprises a main positioning member 231 and a sub positioning member 232. The sub positioning member 232 is fixedly connected to the main positioning member 231. The sub positioning member 232 extends for a fixing distance D1 along the main positioning member 231. The fixing distance D1 is optimized as a value between 1 millimeter and 5 millimeter to fit the side of the optical film. In a preferred embodiment, the main positioning member 231 and the sub positioning member 232 are integrally manufactured in a piece. This means that the sub positioning member 232 is extended from a part or all of the main positioning member 231.

The main positioning member 231 is stuck on the side surface of the LGP 21. Preferably, a stickiness material, such as a mylar capable of enduring high temperature, is spread on the inner side of the main positioning member 231. In this way, the main positioning member 231 can be fixed on the LGP 21 by the stickiness material such that the positioning structure 23 is fixed on the LGP 21. The sub positioning members 232 placed on the opposite sides of the LGP 21 can fix the optical film 22 on the emitting surface of the LGP 21 because of the above-mentioned fixing distance D1.

Figure 4:
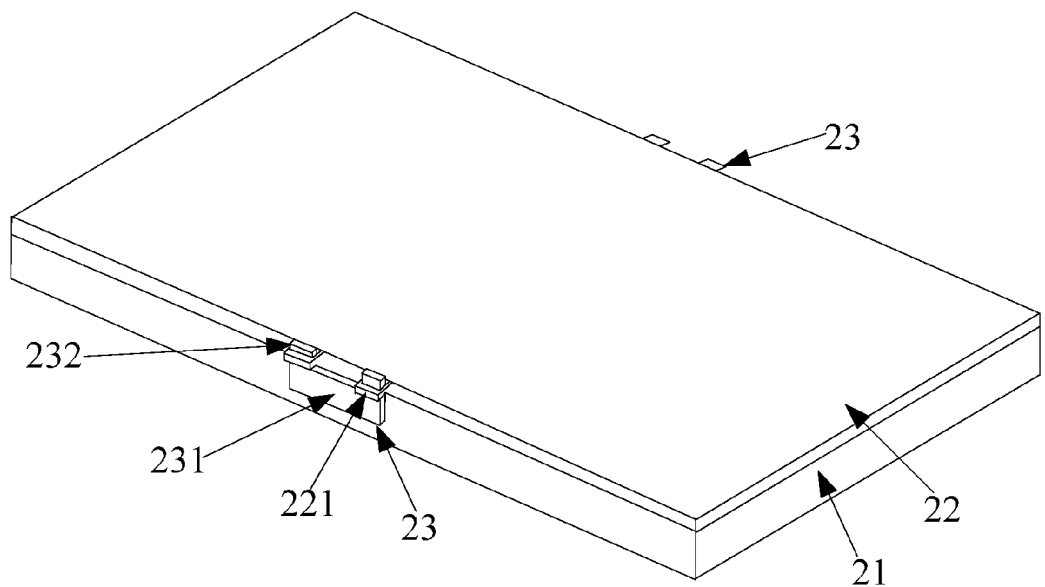
FIG. 4 is a diagram of a backlight module according to another embodiment of the present invention.

Please refer to FIG. 4, which is a diagram of a backlight module according to another embodiment of the present invention. The optical film 22 has an extension part 221 connected to the sub positioning member 232. The extension part 221 has a trench (not shown) corresponding to the sub positioning member 232. The sub positioning member 232 can be plugged inside the trench to better fix the optical film 22.

In the actual implementation, a reflection material, such as a reflection material having a white color or a white coating capable of reflecting light, is spread on the inner side of the main positioning member 231. Through the reflection material, the reflection effect of the LGP 21 can be better.

Figure 5:
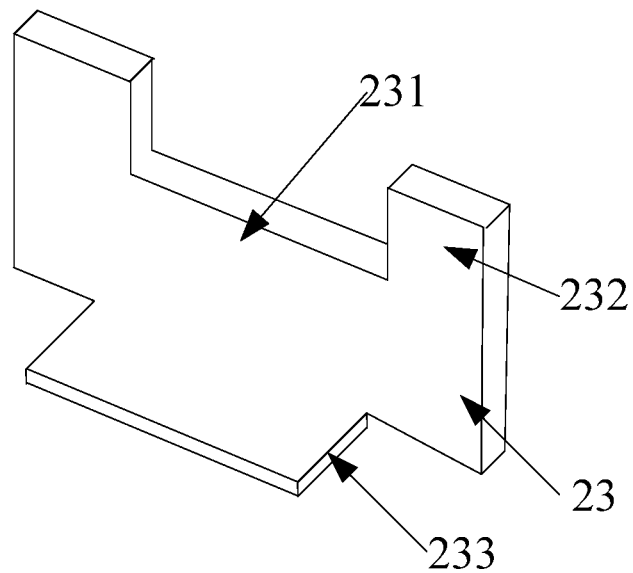
FIG. 5 is a diagram showing a positioning structure according to a second embodiment of the present invention.

Please refer to FIG. 5, which is a diagram showing a positioning structure according to a second embodiment of the present invention. Differing from the first embodiment, the positioning structure 23 further comprises a fixing member 233 formed by bending an end or all of the positioning structure 231.

In the second embodiment shown in FIG. 5, the fixing member 233 is stuck on the bottom surface of the LGP 21. A stickiness material, such as mylar, is spread on the inner side of the fixing member 233 such that the fixing member 233 is stuck on the bottom surface of the LGP 21. Other methods can be used to fixedly connect the LGP 21 and the fixing member 233, and these methods all obey the spirit of the present invention.

Preferably, a reflection material, such as a reflection material having a white color or a white coating capable of reflecting light, is spread on the inner side of the fixing member 233. Through the reflection material, the reflection effect of the LGP 21 can be better.

Figure 6:
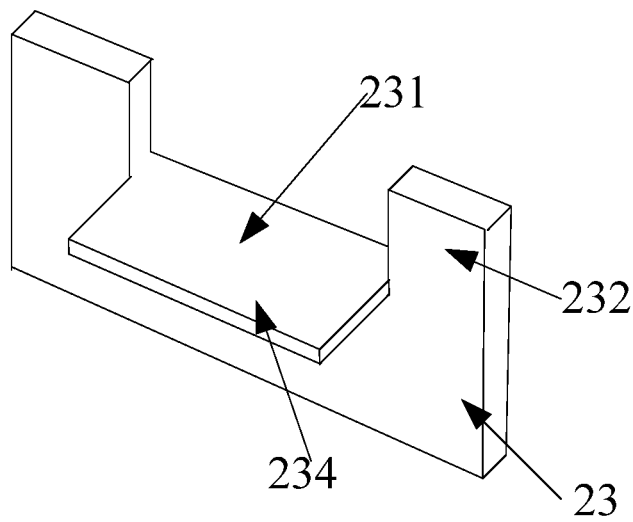
FIG. 6 is a diagram of a positioning structure according to a third embodiment of the present invention.

Please refer to FIG. 6, which is a diagram of a positioning structure according to a third embodiment of the present invention. In the third embodiment, the positioning structure 23 comprises a fixing member 234 where the fixing member 234 and the sub positioning member 232 are placed on the same end where the main positioning member 231 are placed on. The fixing member 234 is formed by bending part of the main positioning member 231 at an end, and the remains of the main positioning member 231 serves as the sub positioning member 232.

The fixing member 234 is stuck on the emitting surface of the LGP 21. A stickiness material is spread on the inner side of the fixing member 234 such that the fixing member 234 is stuck on the emitting surface of the LGP 21. Other methods can be used to fixedly connect the LGP 21 and the fixing member 234, and these methods all obey the spirit of the present invention.

Figure 7:
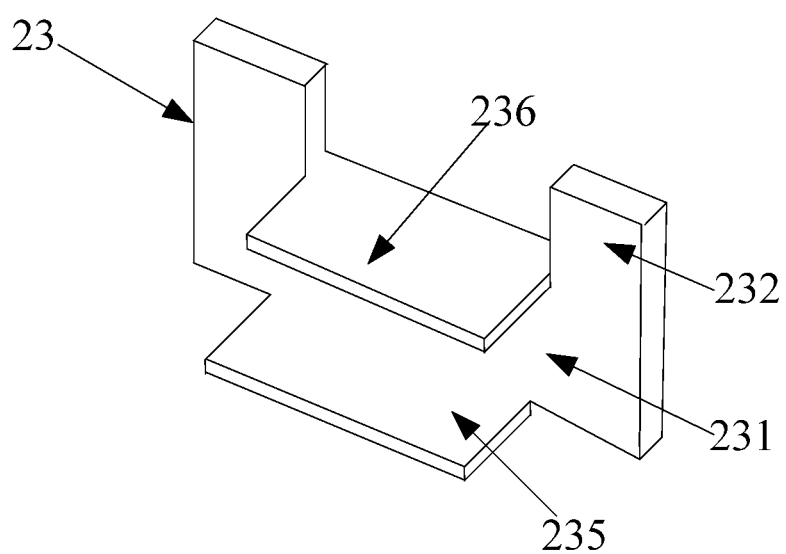
FIG. 7 is a diagram of a positioning structure according to a fourth embodiment of the present invention.

Please refer to FIG. 7, which is a diagram of a positioning structure according to a fourth embodiment of the present invention. In this embodiment, the positioning structure 23 comprises a first fixing member 235 and a second fixing member 236. The first fixing member 235 and the second fixing member 236 are placed on the opposite ends of the main positioning member 231. The second fixing member 236 and the sub positioning member 232 are placed on the same end of the main positioning member 231.

The first fixing member 235 is fixedly connected to the bottom surface of the LGP 21 through a stickiness material, and a reflection material, such as a reflection material having a white color or a white coating capable of reflecting light, is spread on the inner side of the main positioning member 235. Through the reflection material, the reflection effect of the LGP 21 can be better.

A stickiness material is spread on the inner side of the fixing member 236 such that the fixing member 236 is stuck on the emitting surface of the LGP 21. Other methods can be used to fixedly connect the LGP 21 and the fixing member 236, and these methods all obey the spirit of the present invention.

Please note, in the above-mentioned embodiments, the main positioning member 231, the sub positioning member 232, and fixing members 233, 234, 235, and 236 are all manufactured with metal materials. Furthermore, the thickness of each of the main positioning member 231, the sub positioning member 232, and fixing members 233, 234, 235, and 236 is between 0.2 millimeter and 0.4 millimeter.

The present invention further provides a display panel having the above-mentioned backlight module. Since the backlight module has been illustrated in the above disclosure, further illustration is omitted here.

In contrast to the related art, the present invention provides a positioning structure. The positioning structure comprises a main positioning member and a sub positioning member fixedly connected to the main positioning member. The sub positioning member extends for a fixing distance along the main positioning member. The main position member is fixed on the side surface of the light guiding plate, and the two opposite sub positioning members can position the optical film on the emitting surface. Moreover, the present invention can align the optical film with the light guiding plate and prevent from influencing the view region without affecting the extension when the optical film is heated up. This raises the display performance of the LCD panel.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A backlight module comprising:
    a light guiding plate, having a emitting surface, a bottom surface opposite to the emitting surface, and a plurality of side surfaces;
    an optical film, stuck on the emitting surface of the light guiding plate; and
    at least two positioning structures, placed on two side surfaces opposite to each other, wherein each of the two positioning structures comprises a main positioning member and a sub positioning member, the main positioning member and the sub positioning member are integrally manufactured in a piece, and the sub positioning member is formed by extending an end or all of the main positioning member;
    wherein the main positioning member is fixed on the side surface of the light guiding plate, a reflection material is spread on an inner side of the main positioning member, the sub positioning member extends for a fixing distance along the main positioning member, and the at least two sub positioning members placed oppositely fix the optical film on the emitting surface of the light guiding plate.

2. The backlight module of claim 1, wherein the positioning structure further comprises a fixing member formed by bending part or all of the main positioning member at one end, and is stuck on the emitting surface or bottom surface of the light guiding plate.

3. The backlight module of claim 2, wherein the fixing member is stuck on the emitting surface of the light guiding plate, and the fixing member is formed by bending part of the main positioning member at one end and the sub positioning member is formed by the remains of the main positioning member at the end.

4. The backlight module of claim 2, wherein the fixing member is stuck on the bottom surface of the light guiding plate.

5. The backlight module of claim 2, wherein the fixing member further comprises a first fixing member and a second fixing member, the first fixing member is stuck on the bottom surface of the light guiding plate, and the second fixing member is stuck on the emitting surface of the light guiding plate.

6. The backlight module of claim 2, wherein the optical film comprises an extension part connected to the sub positioning member, the extension part has a trench for allowing the sub positioning member to plug in.

7. The backlight module of claim 2, wherein a thickness of each of the main positioning member, the sub positioning member, and fixing member is between 0.2 millimeter and 0.4 millimeter.

8. The backlight module of claim 2, wherein the fixing distance is between 1.0 millimeter and 5.0 millimeter.

9. A backlight module comprising:
    a light guiding plate, having a emitting surface, a bottom surface opposite to the emitting surface, and a plurality of side surfaces;
    an optical film, stuck on the emitting surface of the light guiding plate; and
    at least two positioning structures, placed on two side surfaces opposite to each other, each of the two positioning structures comprising a main positioning member and a sub positioning member;

wherein the main positioning member is fixed on the side surface of the light guiding plate, the sub positioning member extends for a fixing distance along the main positioning member, and the at least two sub positioning members placed oppositely fix the optical film on the emitting surface of the light guiding plate.

10. The backlight module of claim 9, wherein the main positioning member and the sub positioning member are integrally manufactured in a piece, and the sub positioning member is formed by extending part or all of the main positioning member at one end.

11. The backlight module of claim 9, wherein the positioning structure further comprises a fixing member formed by bending part or all of the main positioning member at one end, and is stuck on the emitting surface or the bottom surface of the light guiding plate.

12. The backlight module of claim 11, wherein the fixing member is stuck on the emitting surface of the light guiding plate, and the fixing member is formed by bending part of the main positioning member at an end, and remains of the main positioning member at the end form the sub positioning member.

13. The backlight module of claim 11, wherein the fixing member is stuck on the bottom surface of the light guiding plate.

14. The backlight module of claim 11, wherein the fixing member further comprises a first fixing member and a second fixing member, the first fixing member is stuck on the bottom surface of the light guiding plate, and the second fixing member is stuck on the emitting surface of the light guiding plate.

15. The backlight module of claim 11, wherein the optical film has an extension part connected to the sub positioning member, the extension part has a trench for allowing the sub positioning member to plug in.

16. The backlight module of claim 11, wherein a thickness of each of the main positioning member, the sub positioning member, and fixing member is between 0.2 millimeter and 0.4 millimeter, the fixing distance is between 1.0 millimeter and 5.0 millimeter.

17. The backlight module of claim 9, wherein a reflection material is spread on an inner side of the main positioning member.

18. A display panel comprising a backlight module, the backlight module comprising:
a light guiding plate, having a emitting surface, a bottom surface opposite to the emitting surface, and a plurality of side surfaces;
an optical film, stuck on the emitting surface of the light guiding plate; and
at least two positioning structures, placed on two side surfaces opposite to each other, each of the two positioning structures comprising a main positioning member and a sub positioning member;
wherein the main positioning member is fixed on the side surface of the light guiding plate, the sub positioning member extends for a fixing distance along the main positioning member, and the at least two sub positioning members placed oppositely fix the optical film on the emitting surface of the light guiding plate.

* * * * *